United States Patent Office 3,697,266
Patented Oct. 10, 1972

3,697,266
ORGANIC PHOTOCONDUCTIVE MATERIALS FOR ELECTROPHOTOGRAPHY
Hisatake Ono, Chiakai Osada, Syu Watarai, and Harumi Katsuyama, Asaka, Japan, assignors to Fuji Photo Film Co., Ltd., Kanagawa, Japan
No Drawing. Filed Dec. 30, 1970, Ser. No. 102,881
Claims priority, application Japan, Dec. 30, 1969, 45/1,635
Int. Cl. G03g 5/00; H01l 13/00
U.S. Cl. 96—1.5
3 Claims

ABSTRACT OF THE DISCLOSURE

An electrophotographic material comprising an electroconductive layer having coated thereon a layer containing a polymer of a compound of the following general formula,

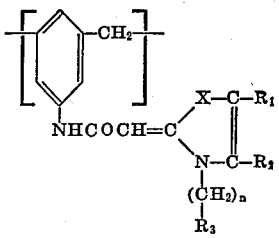

wherein X is an atom or atomic group of atoms necessary for completing a heterocyclic ring, $R_1$ and $R_2$ are each a hydrogen atom, an alkyl group or an aryl group, $R_3$ is a hydrogen atom, alkoxyl group, cyano group or phenyl group, and $n$ is an integer having the value of 1–4, and the aforementioned $R_1$ and $R_2$ may, in combination, form an unsubstituted or substituted arylene group.

---

This invention relates to organic photoconductive materials for electrophotography. More particularly, this invention relates to organic photoconductive materials for electrophotography having, as main component, high molecular compounds of the general formula:

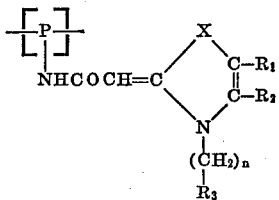

The compounds are obtained by the reaction of polyisocyanates with heterocyclic compounds having exomethylene groups in the enamine form.

In the foregoing formula, P represents a polymer chain, X represents an atom or atomic group necessary for completing a heterocyclic ring, $R_1$ and $R_2$ each represents hydrogen atom, alkyl group or aryl group, $R_3$ represents hydrogen atom, alkoxyl group, cyano group or phenyl group, $n$ is an integer of 1–4, and said $R_1$ and $R_2$ may in combination, form an unsubstituted or substituted arylene ring.

Examples of atoms or atomic groups necessary, for completing the heterocyclic ring represented by X are O, S, Se, NR,

(R being a lower alkyl having 1 to 4 carbon atoms) and —CH=CH—.

Heterocyclic compounds possessed of exomethylene groups in the enamine structure form are represented by the following general formula:

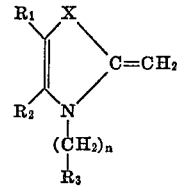

wherein $R_1$ and $R_2$ each represents hydrogen atom, alkyl group or aryl group and they may, in combination, form an arylene ring which may be substituted with such various substituents as halogen atom, alkyl group, nitro group, alkoxyl group, and alkoxycarbonyl group, $R_3$ represents hydrogen atom, alkoxyl group, cyano group or phenyl group, $n$ is an integer of 1–4 and X is an atom or atomic group necessary for completing a heterocyclic ring, such as O, S, Se, NR,

or —CH=CH—.

It has already been known in the art, for example, in M. Coenen. Ber. 80, 546 (1947), that heterocyclic compounds having the aforementioned type exomethylene groups readily react with isocyanates to produce amide derivatives.

It may be easily understood by any person skilled in the art that, if the isocyanate group is introduced into the high molecular ring in the aforementioned known reaction, it will react with the exomethylene group to afford a compound having the aforementioned heterocyclic ring in the high molecule through amide combination. To be specific, the introduction of the isocyanate group into the high molecular chain can be easily accomplished by reacting phosgene with a high molecular compound having amino group (as disclosed in Org. Synth. 31, 62 (1952) for example).

Recently, polyisocyanates have come to be produced on commercial scale. For example, Upjohn Company (United States) sells polymethylene polyphenylisocyanates (abbreviated as PAPI) of the following general formula:

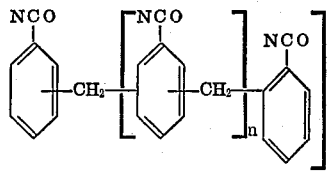

The reaction between isocyanate group and exomethylene group proceeds readily when the reaction system is heated in an aprotic organic solvent such as benzene, carbon tetrachloride, carbon disulfide, dioxane, ether or toluene. Extraction of the reaction product can be accomplished by pouring the system into a non-solvent to high molecular weight whereby the product is eluted in the form of precipitate. The reaction terminates completely when the isocyanate group and the exomethylene group are in equimolar weight at the time of reaction. Where the exomethylene group is smaller in weight, however, it is possible that part of the isocyanate group will remain unreacted. Since the residual isocyanate group has no significant effect upon electrophotographic characteristics, the reaction product containing such residual isocyanate group may be used as an electrophotographic material. Satisfactory results can also be derived from completing the reaction of isocyanate group through addition reaction with another compound having active hydrogen. In case where the high molecular compound having isocyanate group does not have a sufficiently high molecular weight, it is possible to convert it into a giant molecule by allowing a desired amount of isocyanate group to remain unreacted and then causing it to react with a compound having two or more functional groups such as diamine or diol which are capable of reacting with isocyanate group. In addition, the reaction brought about with a high molecular compound possessed of functional groups capable of reacting with isocyanate group is advantageous in that the finally derived reaction product acquires further improved physical properties.

In using the high molecular compound thus obtained as a photoconductive material for electrophotography, the film-forming capacity of this high molecular substance can be utilized. Namely, it is dissolved in a suitable solvent and the resultant solution is coated on an electroconductive base so as to form a layer thereon. In case where the compound does not have a sufficiently high molecular weight and consequently is destitute of film-forming capacity, it may be used in conjunction with a film-forming binder so as to form a layer. No limit is placed on using a plasticizer for the purpose of imparting additional tenacity to the photosensitive layer. It is also possible to use a sensitizer for enhancing the sensitivity. The examples of the sensitizers are tetracyanoethylene, tetracyanoquinodimethane, chloranil bromanil, naphthoquinone, anthraquinone, methylene blue, crystal violet and malachite green.

As examples of film-forming binders to be used where the film-forming capacity is insufficient, there may be cited styrene/butadiene copolymer, polystyrene, chlorinated rubber polyvinyl chloride, vinyl chloride/vinyl acetate copolymer, polyvinylidene chloride, nitrocellulose, polyvinyl acetate, polyvinyl acetal, polyvinyl ether, silicone resin, acrylic resin, methacrylic resin, phenyl resin, alkyd resin, and urea-aldehyde resin, etc. The amount of the binders are decided by the capacity of the above compound. Advantageous plasticizers which are used for improving film-forming capacity include chlorinated biphenyl, chlorinated paraffin, phosphate type plasticizers and phthalate type plasticizers. As electroconductive bases, metallic plates, paper and plastic films treated so as to acquire electroconductivity give satisfactory results. It is proper to combine these materials so as to obtain a sensitive layer having a dry thickness of 2 to 20μ. When this layer in the state substantially destitute of residual solvent is uniformly charged with corona discharge, exposed to light projected through an image, and then treated by either cascade developing process or liquid developing process according to the conventional method of electrophotography, there can be effected image development.

In the case of the cascade developing process, fixing of image can be accomplished by either mildly heating the sensitive layer subsequent to the step of development or placing the layer in the vapor of an organic solvent capable of dissolving the resin ingredient of the toner.

The present invention is described more specifically by citing hereinafter examples of synthesis and working embodiments of the invention. It should be construed that the invention is not limited to these examples.

EXAMPLE 1 OF SYNTHESIS

Preparation of

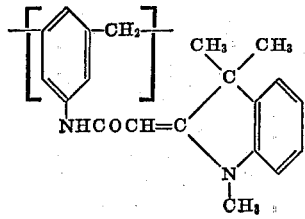

When a solution of 10 g. of 1,3,3-trimethyl-2-methyleneindoline in 10 ml. of acetone is mixed with a solution of 13 g. of polymethylene polyphenylisocyanate (aforementioned PAPI) in 20 ml. of acetone, there occurs an exothermic reaction. The reaction system is heated for reflux for 3 hours. At the end of this period, it is poured with vigorous stirring into methanol, with the result that there is eluted a polymer. Through subsequent filtration and drying, there is obtained 20 g. of a polymer of a milky peach color. By the infrared absorption spectrometry, this polymer is found to show a weaker absorption due to isocyanate group at 2260 cm.$^{-1}$, indicating that there has been a progress in the reaction. Since the isocyanate radical is used in a larger quantity stoichiometrically than the exomethylene group, the absorption at 2260 cm.$^{-1}$ due to the unreacted isocyanate group is found to have decreased.

EXAMPLE 2 OF SYNTHESIS

Preparation of

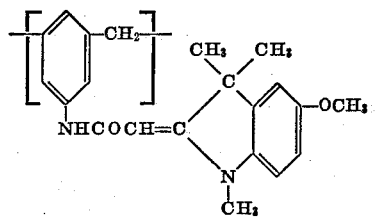

By treating 10.2 g. of 1,3,3-trimethyl-5-methoxy-2-methyleneindoline and 6.6 g. of PAPI in the same procedure as Example 1 above, there is obtained 3.5 g. of a polymer having a grayish yellow color. By the infrared absorption spectrometry, it is shown that the isocyanate group in this polymer has been reacted completely.

EXAMPLE 3 OF SYNTHESIS

Preparation of

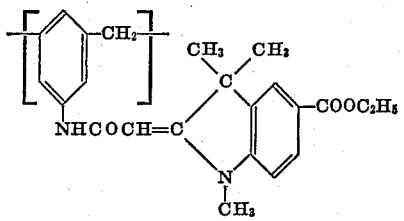

By treating 6.1 g. of 1,3,3-trimethyl-5-carboethoxy-2-methyleneindoline and 3.3 g. of PAPI in the same procedure as Example 1 above, there is obtained 3.5 g. of a polymer having a milky gray color.

EXAMPLE 4 OF SYNTHESIS

Preparation of

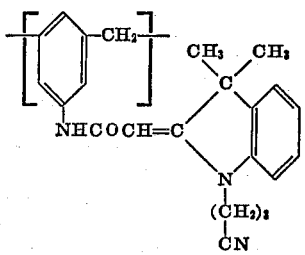

From 6.8 g. of 1-cyanopropyl-3,3-dimethyl-2-methyleneindoline and 4 g. of PAPI, there is obtained 5 g. of a polymer having a yellow color.

EXAMPLE 5 OF SYNTHESIS

Preparation of

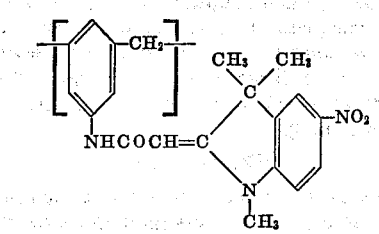

From 2.2 g. of 1,3,3-trimethyl-5-nitro-2-methyleneindoline and 2.5 g. of PAPI, there is obtained 3 g. of a polymer having a yellow color.

EXAMPLE 6 OF SYNTHESIS

Preparation of

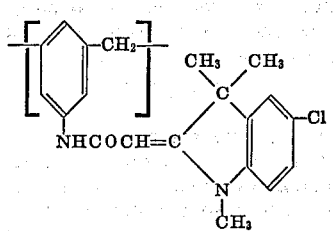

From 4.2 g. of 1,3,3-trimethyl-5-chloro-2-methyleneindoline and 2.6 g. of PAPI, there is obtained 3.5 g. of a polymer having a grayish yellow color.

EXAMPLE 7 OF SYNTHESIS

Preparation of

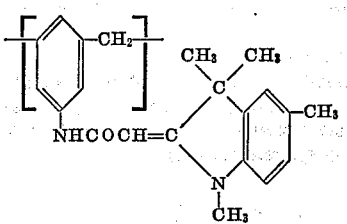

From 5.6 g. of 1,3,3,5-tetramethyl-2-methyleneindoline and 4 g. of PAPI, there is obtained 5.5 g. of a polymer having a milky yellow color.

EXAMPLE 8 OF SYNTHESIS

Preparation of

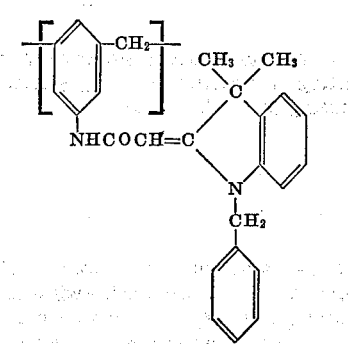

From 2.5 g. of 1-benzyl-3,3-dimethyl-2-methyleneindoline and 1.3 g. of PAPI, there is obtained 1.8 g. of a polymer having a color of yellow ocher.

EXAMPLE 9 OF SYNTHESIS

Preparation of

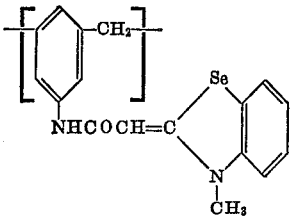

From 2.2 g. of 1-methyl-2-methylenebenzselenazoline and 2.6 g. of PAPI, there is obtained 3.2 g. of a polymer having a color of yellow ocher.

EXAMPLE 10 OF SYNTHESIS

Preparation of

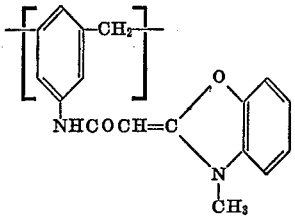

In 10 ml. of water, 3.2 g. of 1,2-dimethylbenzoxazolium paratoluenesulfonate is dissolved. To this solution, 1 N aqueous solution of caustic soda is added until pH 7 is obtained. The reaction system is separated into two phases. This is extracted with 50 ml. of benzene and the benzene fraction is dehydrated through drying with anhydrous Glauber's salt. The resultant solution is concentrated under a reduced pressure and then combined with 10 ml. of dry benzene. This mixture, with 1.3 g. of PAPI added thereto, is heated for reflux for 3 hours. Then the solution is concentrated to half the original volume under a reduced pressure and then poured into a 2 lit. of methanol, with the resultant that there is obtained 1.8 g. of a polymer having a yellowish white color.

EXAMPLE 11 OF SYNTHESIS

Preparation of

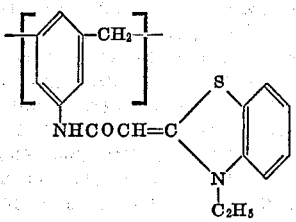

By treating 3 g. of 1-ethyl-2-methylbenzthiazolium iodide in the same procedure as Example 10 above and then allowing it to react with 1.3 g. of PAPI, there is obtained 2.1 g. of a polymer having a yellowish gray color.

EXAMPLE 12 OF SYNTHESIS

Preparation of

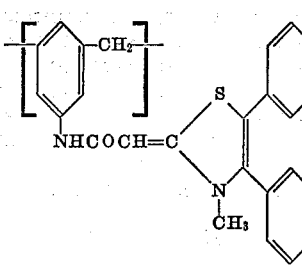

By treating 4.4 g. of 1,2-dimethyl-4,5-diphenylthiazolidium paratoluene sulfonate in the same procedure as Example 10 above and allowing it to react with 1.3 g. of PAPI, there is obtained 2 g. of a polymer having a yellowish gray color.

EXAMPLE 13 OF SYNTHESIS

Preparation of

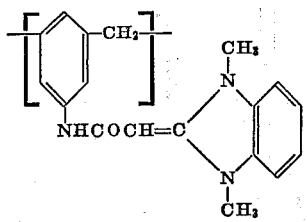

By treating 5.7 g. of 1,2,3-trimethylbenzimidazolium iodide in the same procedure as Example 10 above and then allowing it to react with 2.5 g. of PAPI, there is obtained 4.3 g. of a polymer having a yellowish white color.

EXAMPLE 14 OF SYNTHESIS

Preparation of

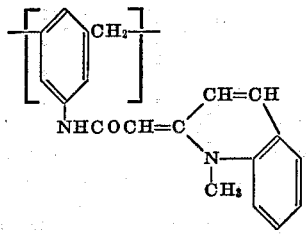

By treating 2.8 g. of 1-methyquinaldinium iodide in the same procedure as Example 10 above and then allowing it to react with 1.3 g. of PAPI, there is obtained 2.3 g. of a polymer having a color of yellow ocher.

EXAMPLE 15 OF SYNTHESIS

In 30 ml. of tetrahydrofuran, 5 g. of the polymer obtained in Example 5 above and 0.3 g. of hexamethylene diamine are dissolved and heated for reflux for 3 hours. The resultant solution is concentrated under a reduced pressure. When the residual glutinous substance is combined with methanol, there is obtained a polymer in the form of powder. The yield is 3.4 g. From the solubility of the polymer as well as the appearance of absorption at 1660 cm.$^{-1}$ due to urea combination and the disappearance of absorption at 2260 cm.$^{-1}$ due to isocyanate in the infrared absorption spectrometry, it is evident that the unreacted isocyanate group has reacted with the amino group and the reaction product has undergone urea combination to become a high molecular compound.

EXAMPLE 1

In 5 ml. of tetrahydrofuran, 1 g. of the polymer obtained by Example 1 of Synthesis was dissolved. This solution was spread on an aluminum plate and dried to obtain a layer having a thickness of about 5μ.

This layer was subjected to corona discharge at 5 kv. to have the surface thereof positively charged. With a film containing a positive image laid thereover, the layer was exposed to a light from a 100 watt incandescent lamp placed above at a distance of 30 cm. for 3 seconds. When the layer was treated with a developing agent containing negatively charged toner particles (developing agent for Xerox 914, for example), there was obtained a positive image. When it was placed in the atmosphere of trichloroethylene, the image was fixed to produce a clear positive image.

EXAMPLE 2

A clear positive image could be obtained by treating the polymer obtained in Example 2 of Synthesis in the same procedure as in Example 1.

EXAMPLE 3

In 5 ml. of dimethylformaldehyde, 1 g. of the polymer obtained in Example 9 of Synthesis was dissolved. By spreading the resultant solution on an aluminum plate to a dry layer thickness of 5μ, drying the layer, charging it, exposing it to light from a 100 watt incandescent lamp placed above at a distance of 30 cm., and subjecting it to the steps of development and fixing, there was obtained a clear image.

EXAMPLE 4

A clear image was obtained by treating the polymer obtained in Example 10 of Synthesis in the same procedure as in Example 1.

EXAMPLE 5

A clear image was obtained by treating the polymer obtained in Example 11 of Synthesis in the same procedure as in Example 1.

EXAMPLE 6

A clear image was obtained by treating the polymer obtained in Example 14 of Synthesis in the same procedure as in Example 1.

EXAMPLE 7

In 3 ml. of dimethylformamide, 0.5 g. of the polymer obtained in Example 5 of Synthesis was dissolved. The resultant solution was mixed uniformly with 10 ml. of 10% benzene solution of polystyrene added thereto, and the mixture was spread on an aluminum plate to a dry layer thickness of 5μ. After drying the layer was charged. With a positive image film laid thereon, the layer was exposed for about 3 seconds to light from a high-pressure mercury lamp (SHL–100 made by Toshiba) placed above at a distance of 30 cm. and subjected to the steps of development and fixing. Thus, there was obtained a clear image. Compared with the photoconductive layer prepared solely of the polymer obtained in Example 5 of Synthesis, the present layer was found to be improved in film quality.

What is claimed is:

1. An electrophotographic photoconductive material comprising an electroconductive layer having coated thereon a layer containing a polymer of a compound of the following general formula,

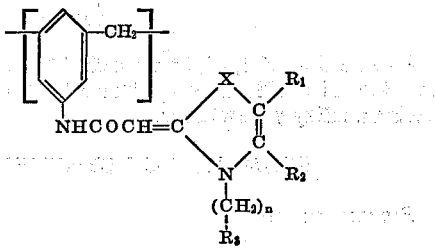

wherein X is an atom or atomic group of atoms necessary for completing a heterocyclic ring, selected from the group consisting of O, S, Se, NR,

and —C=CH—, wherein R is a lower alkyl having 1–4 carbon atoms, R$_1$ and R$_2$ are each hydrogen atom, alkyl group or aryl group, R$_3$ is a hydrogen atom, alkoxyl group, cyano group or phenyl group, and n is an integer having the value of 1–4, and the aforementioned R$_1$ and R$_2$ may, in combination, form an unsubstituted or substituted arylene group.

2. The material as claimed in claim 1 wherein said layer contains a plasticizer.

3. The material as claimed in claim 1 wherein said layer contains a sensitizer.

References Cited

UNITED STATES PATENTS

| 3,037,861 | 6/1962 | Hoegl et al. | 96—1 |
| 3,113,022 | 12/1963 | Cassiers et al. | 96—1 |
| 3,155,503 | 11/1964 | Cassiers et al. | 96—1 |
| 3,159,483 | 12/1964 | Behmenburg | 96—1 |
| 3,232,755 | 2/1966 | Hoegl et al. | 96—1 |
| 3,279,918 | 10/1966 | Cassiers et al. | 96—1 |
| 3,287,120 | 11/1966 | Hoegl | 96—1.5 |
| 3,512,966 | 5/1970 | Shattuck et al. | 96—1 |
| 3,554,741 | 1/1971 | Gipstein et al. | 96—1 |

GEORGE F. LESMES, Primary Examiner

M. B. WITTENBERG, Assistant Examiner

U.S. Cl. X.R.

260—88.3 R, 2 R, 77.5 CH